(12) United States Patent
Trujillo et al.

(10) Patent No.: US 8,439,405 B2
(45) Date of Patent: May 14, 2013

(54) CRIMPED OR SWAGED COUPLINGS FOR CABLE REINFORCED HOSES

(75) Inventors: Ron Trujillo, Highlands Ranch, CO (US); Jonathan Clark Swift, Cambridge (GB); Lance D. Miller, Highlands Ranch, CO (US)

(73) Assignee: The Gates Corporation, Denver, CO (US)

( * ) Notice: Subject to any disclaimer, the term of this patent is extended or adjusted under 35 U.S.C. 154(b) by 256 days.

(21) Appl. No.: 12/803,096

(22) Filed: Jun. 18, 2010

(65) Prior Publication Data

US 2011/0309613 A1 Dec. 22, 2011

(51) Int. Cl.
*F16L 33/00* (2006.01)
(52) U.S. Cl.
USPC .......................................... 285/256; 285/915
(58) Field of Classification Search .................. 285/242, 285/256, 382, 915
See application file for complete search history.

(56) References Cited

U.S. PATENT DOCUMENTS

| | | | | |
|---|---|---|---|---|
| 2,661,225 A | * | 12/1953 | Lyon ............................ | 285/222.4 |
| 2,920,910 A | * | 1/1960 | Schnabel ..................... | 285/222.4 |
| 3,165,338 A | * | 1/1965 | Moss ............................. | 285/256 |
| 3,347,571 A | * | 10/1967 | New ............................. | 285/222.4 |
| 3,423,109 A | * | 1/1969 | New et al. .................... | 285/222.1 |
| 3,951,438 A | * | 4/1976 | Scales ............................. | 285/55 |
| 4,106,526 A | * | 8/1978 | Szentmihaly .................. | 138/109 |
| 4,275,769 A | | 6/1981 | Cooke | |
| 4,353,581 A | * | 10/1982 | Eisenzimmer ............. | 285/222.4 |
| 4,369,992 A | * | 1/1983 | Fournier et al. ................ | 285/256 |
| 4,498,691 A | * | 2/1985 | Cooke ................................. | 285/12 |
| 4,548,430 A | * | 10/1985 | Haubert et al. ................ | 285/256 |
| 4,657,285 A | * | 4/1987 | Akiyama et al. ............... | 285/256 |
| 4,660,867 A | * | 4/1987 | Kemper et al. ................ | 285/256 |
| 4,664,424 A | * | 5/1987 | Smith ............................ | 285/256 |
| 5,190,323 A | * | 3/1993 | Oetiker ............................ | 285/39 |
| 5,255,944 A | * | 10/1993 | Blin et al. ................... | 285/222.2 |
| 5,591,142 A | * | 1/1997 | Van Erp ......................... | 604/526 |
| 6,773,038 B2 | * | 8/2004 | Villano et al. ................ | 285/256 |
| 7,014,215 B2 | * | 3/2006 | Cooper et al. ................. | 285/247 |
| 7,014,218 B2 | * | 3/2006 | Fisher et al. .................. | 285/256 |
| 7,429,065 B2 | * | 9/2008 | Alder et al. ................... | 285/259 |
| 7,624,504 B2 | * | 12/2009 | Watanabe ................ | 29/890.144 |

(Continued)

FOREIGN PATENT DOCUMENTS

| | | |
|---|---|---|
| DE | 2104744 A1 | 8/1972 |
| DE | 19635053 A1 | 3/1998 |
| EP | 2196716 A1 | 6/2010 |
| GB | 2220242 A | 1/1990 |

*Primary Examiner* — Aaron Dunwoody
(74) *Attorney, Agent, or Firm* — P. N. Dunlap, Esq.; J. A. Thurnau, Esq.

(57) ABSTRACT

A hose coupling for fitment to an end of a cable reinforced hose includes a unitary stem having a cable trap groove portion having an outside diameter greater than an inside diameter of a tube of the hose and less than an inside diameter of the hose with the tube skived from the hose. A unitary ferrule defines at least one cable trap rib corresponding to the cable trap groove and having an inside diameter less than the outside diameter of the cable reinforced hose and greater than an outside diameter of the hose with material covering the cable skived from the hose. The groove width is at least the width of the rib plus twice the diameter of cable reinforcing the hose. Epoxy may be disposed between the hose tube and the stem for sealing or injected between the ferrule and the stem permeating the cable.

15 Claims, 3 Drawing Sheets

U.S. PATENT DOCUMENTS

| | | | |
|---|---|---|---|
| 7,661,720 B2* | 2/2010 | Nakano et al. | 285/242 |
| 8,020,897 B2* | 9/2011 | Katayama et al. | 285/256 |
| 2003/0205898 A1* | 11/2003 | Baldwin et al. | 285/256 |
| 2004/0032124 A1* | 2/2004 | Lefere et al. | 285/242 |
| 2004/0251683 A1* | 12/2004 | Fisher et al. | 285/256 |
| 2005/0001424 A1* | 1/2005 | Watanabe | 285/256 |
| 2006/0226650 A1* | 10/2006 | Alder et al. | 285/259 |
| 2007/0096461 A1* | 5/2007 | Owens | 285/256 |
| 2008/0136176 A1* | 6/2008 | Katayama et al. | 285/256 |
| 2009/0072532 A1* | 3/2009 | Dixon-Roche | 285/256 |
| 2010/0084860 A1* | 4/2010 | Cariccia et al. | 285/256 |
| 2011/0221184 A1* | 9/2011 | Lefere | 285/109 |

* cited by examiner

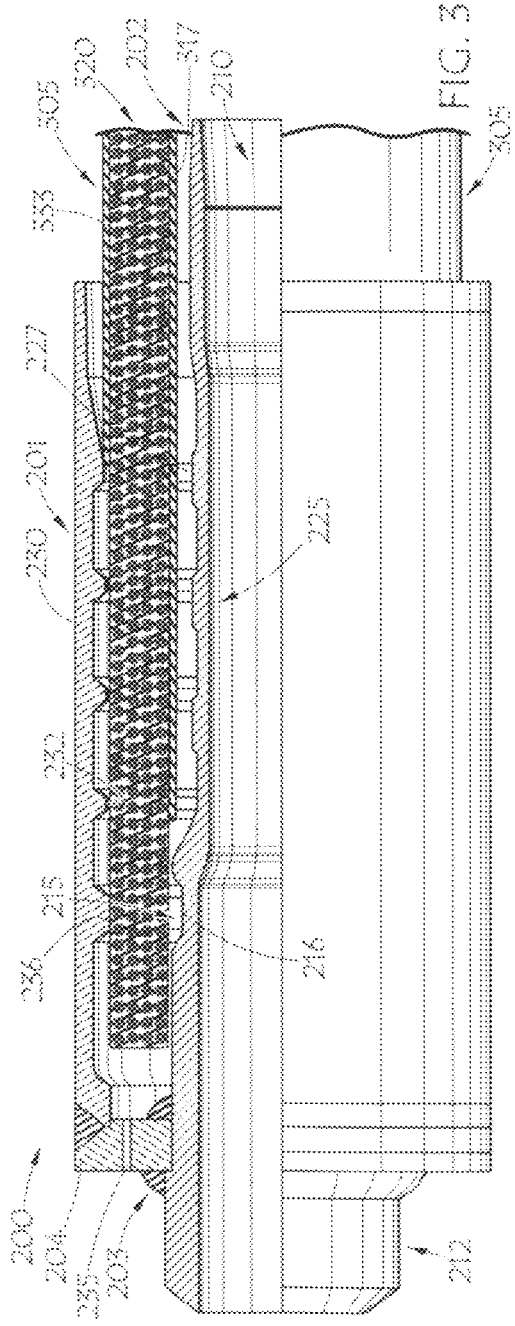
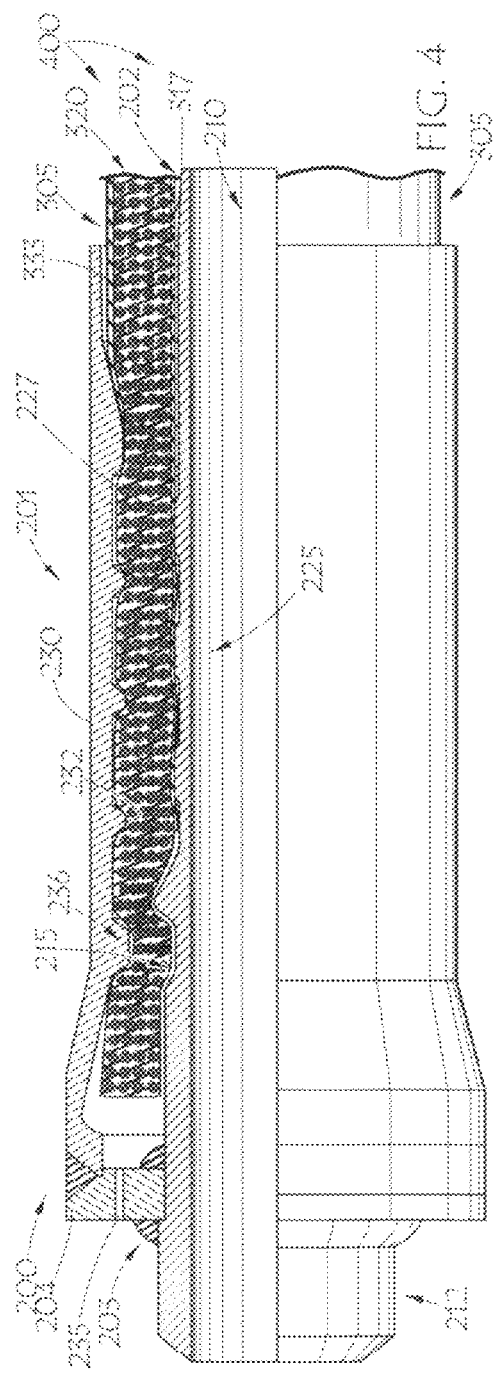

CRIMPED OR SWAGED COUPLINGS FOR CABLE REINFORCED HOSES

BACKGROUND OF THE INVENTION

1. Field of the Invention

This invention relates generally to reinforced hose, more particularly to crimped or swaged couplings for reinforced hose, and specifically to crimped or swaged couplings for cable or wire rope reinforced hoses.

2. Description of the Prior Art

Typically, blow out preventers (BOPs) are used when oil or gas wells are drilled. Blowout preventers are hydraulically controlled valves used to control well kicks and prevent blowouts. A single well may have three or more preventers, stacked one on top of the other. On a land rig, the stack is located beneath the rig floor at ground level. On an offshore rig the BOP may be located on the seafloor. The top preventer on a stack is usually an annular preventer. The annular preventer may be used to completely seal off the drill well annulus (the space between the drill pipe and the borehole). It also can seal off a drill hole that has no pipe. Below the annular preventer are additional controls called ram preventers. The ram preventers are designed to fit around various sizes of drill pipe to hold, close or seal the mud return annulus. Blind rams are used to seal off an open hole. Pipe rams can seal off the drill pipe and the hole.

Rock formations may contain pockets of oil, gas or water under extremely high pressures. A drilled hole may intersect any of these. When any of these high-pressure fluids enter the hole it is referred to as a "kick." When a well kicks, there are several options for handling the kick. The resulting downhole pressure can be cycled out through the BOP system's manifolds at the surface. Alternatively, an attempt can be made to force the downhole fluid back into the formation, such as by pumping drilling fluid under high pressure into the hole through a choke and kill line. Choke and kill hose is used for this purpose. A final option is to pump in cement, seal off the hole and abandon the drilling operation.

Flexible reinforced pipes and hoses are currently used in Choke and Kill applications on oil rigs. These hoses/pipes and couplings are designed to act as a conduit for the pumping of mud (drilling waste) back down into a well head to block the well head fluid against oil, methane gas and noxious chemicals such as Hydrogen Sulphide, at extreme temperatures and pressures. These hoses typically comprise a rubber polymeric tube and are reinforced using multiple layers of "close wound", high tensile plated steel cables (or wire rope) to withstand flexing and high pressures encountered in oil field and offshore operations. This cable reinforcement is typically wire stranded rope, which is typically interchangeably referred to as "cable" and/or "wire rope." These hoses also typically include multiple layers of fabric reinforcement disposed under the hose cover, which may be a modified nitrile resistant to abrasion, corrosion, cutting, gouging, oil and weather.

Prior crimped or swaged couplings 100 for choke and kill hose applications typically employ ridged ferrule 101 and barbed stem fitting 102, such as shown in prior art FIG. 1. This ferrule and stem are typically welded together (103), leaving an opening, which accepts hose 105. Baldwin, et al., U.S. Pat. No. 7,338,090, employs a "waved" ferrule and stem that joins an end connector to the coke and kill hose. This ferrule and stem are also welded together at the coupling end, leaving an opening, which accepts the reinforced hose. However, in Baldwin, et al., the lands of the ferrule and high points of the stem have a sinusoidal shape, providing the aforementioned "wave." This wave bends the cable/wire rope reinforcement in the hose but does not significantly distort the cables. The stem is designed to support the hose which is inserted over it and under the ferrule. The ferrule is swaged or crimped down onto the hose to provide compressive forces, sealing the hose against the stem and retaining the hose in the coupling. For use with this sort of coupling the cover of the hose is skived (i.e. stripped away) so that the ferrule is able to press down on the cable reinforcement, directly, without the need to penetrate the rubber cover. Still, in designs like Baldwin coupling retention is dependent upon the properties of the rubber to provide a reaction force to compression preventing the cable reinforced hose slipping out of the couplings, such designs may lose their capability at elevated or reduced temperatures where the properties of the rubber layers change and may provide less support.

Other approaches to retaining a fitting on a cable reinforced hose call for unraveling reinforcement cable extending from an end of the hose and welding individual elements (cables) to a coupling. Problematically, such approaches are time consuming, expensive and require qualified welders.

API (American Petroleum Institute) 16 C standards testing includes testing such as a thirty-day exposure test at 20,000 psi working pressure, at elevated temperature, for choke and kill hose assemblies. When choke and kill hose assemblies employing the above-described couplings are exposed to theses conditions it was found that the hose-coupling interface is susceptible to temperature extremes. The properties of the rubber material change at elevated temperature and as a result the rubber can flow and allow the compressive forces in the coupling ferrule to drop. This can result in loss of coupling retention which is not acceptable in choke and kill, or similar, applications.

SUMMARY

The present invention is directed to systems and methods of crimped or swaged couplings for cable or wire rope reinforced hoses where rubber material properties are taken out of the coupling retention mechanism. In order to achieve this, a short length of the internal tube and external cover of the hose is skived. The result of this short length of skiving is that the wire/cable reinforcement can be gripped alone without a need to compress and penetrate the tube or cover. With a relatively short length of cable exposed, a stem and ferrule of the present invention, which forms a reinforcement cable (or wire rope) trap, can be swaged or crimped onto the hose end, gripping the hose without reliance upon rubber properties. In particular, the cable reinforcement is preferably trapped directly between the stem and the ferrule. Specifically, the cable is retained between a raised portion of the stem which incorporates a depression and a serration in the ferrule. Unlike prior approaches, rather than merely bending the cable, maintaining its integrity, the short length of skived cable is squeezed between stem and ferrule in the present systems and methods. This results in distortion of the cable, providing a mechanical lock between the coupling and the hose. Additional retention may be achieved by using a more aggressive ferrule design where the ferrule is forced to flow around the cable when the connection is swaged or crimped.

In accordance with various embodiments of the present invention a hose coupling for fitment to an end of a cable reinforced hose, such as a blowout preventer choke and kill hose, might include a unitary stem and a unitary ferrule, which may be welded, staked or otherwise secured together. Various embodiments of the stem have an inner bore and a termination portion for attaching the coupling and hose on which it is swaged or crimped, such as by welding to a flange, or the like. The stem preferably defines a cable trap groove, which may have a generally trapezoidal, or other polygonal, shape. The root of this groove preferably has an outside diameter that is greater than an inside diameter of a tube of the hose. The outside diameter of the groove root is also preferably less than an inside diameter of the hose with the tube skived from the hose, that is less than the inside diameter of the cable reinforcement layer of the hose. An insert portion of the stem is adapted for insertion into the tube of the hose. The insert preferably defines a plurality of external lands and has an outside diameter generally corresponding to an inside diameter of the tube of the hose.

The unitary ferrule has an outer surface and a first and second inside diameter. The first inside diameter of an unstaked or uncrimped ferrule, is preferably greater than an outside diameter of the wire stranded cable reinforced hose. The second inside diameter of the unstaked, uncrimped or unswaged ferrule may be less than the outside diameter of the cable reinforced hose, but greater than an outside diameter of the hose with material covering the cable skived from the hose, that is greater than the outside diameter of the cable reinforcing layer of the hose. An inner surface portion of the ferrule has a portion that has the first diameter. This portion defines a plurality of ridges, positioned to inter-index with the lands of the stem. Another portion of the inner surface of the ferrule defines at least one generally cable trap rib, shaped and positioned to correspond to the cable trap groove in the stem. This cable trap rib has the second inside diameter and is narrower than the groove. Preferably, the groove has a width that is at least the width of the rib plus twice the diameter of a cable reinforcing the hose and the width of the rib is greater than a diameter of a cable reinforcing the hose, such as on the order of multiple diameters of the cable reinforcing the hose. When the ferrule is secured to the stem, such as by welding or staking the termination portion of the stem preferably extends from the ferrule and the cable trap groove and the insert of the stem are disposed in the ferrule.

In accordance with the present invention prior to disposition of the ferrule of the coupling over an end of the hose, the outside layers of the hose covering the cable reinforcement portion is skived from a distal extent of the end of the hose. The stem is disposed with the insert inserted inside the tube of the hose and the cable trap groove is inserted inside the distal extent of the hose with the tube skived away from the distal extent of the hose.

Accordingly, various embodiments of methods for securing a fitting to the end of a cable reinforced hose, such as a blowout preventer choke and kill hose, in accordance with the present invention calls for skiving layers of the hose covering the cable reinforcement from a distal end portion of the end of the hose and skiving a tube from inside the distal end portion of the hose. The unitary stem having an inner bore, a termination for attaching to a fixture, a cable trap groove and an insert portion is inserted into the skived hose with the insert portion inserted inside the tube of the cable reinforced hose and with the cable trap groove inserted inside the skived distal end portion of the hose. The unitary ferrule is preferably deployed over the end of the hose and the stem with the ridges inter-indexing with lands defined on an outside of the insert and with at least the cable trap rib corresponding to the cable trap groove. Such deployment of the ferrule and the stem may occur generally simultaneously if the ferrule is welded to the stem, prior to disposition. Regardless, following disposition of the ferrule and the stem the ferule is compressed, such as by swaging or crimping, resulting in the ridges compressing the hose to seal the tube in the lands and the rib forcing the cable into the groove, trapping the cable reinforcement in the skived area and thereby securing the coupling to the hose in a manner that does not depend on gripping rubber or polymeric material.

Thus, in accordance with various embodiments of the present invention a hose assembly, such as a blowout preventer choke and kill hose assembly, may be made up from a length of hose having an inner tube, one or more layers of cable reinforcement and one or more layers of rubber covering the reinforcement, wherein the inner tube and the one or more layers of rubber covering are skived from an end portion of the hose. A coupling, such as discussed above, is preferably swaged or crimped on the end portion and a further length of the hose. In accordance with such embodiments, the coupling comprises a unitary ferrule disposed over the end portion of the hose and the further length of the hose. The ferrule has a first inside diameter greater than an outside diameter of the hose and a second inside diameter that may be less than the outside diameter of the hose, but is greater than an outside diameter of the end portion of the hose with the rubber covering skived from the hose. The ferrule defines an inner surface having a plurality of ridges having the first diameter and disposed over the further length of the hose. The ferrule inner surface also preferably defines at least one cable trap rib having the second inside diameter and disposed over the skived end portion of the hose. The coupling also, as discussed above has a unitary stem, which may be secured to or unitary with the ferrule. The stem is preferably disposed in the end portion of the hose and on into the further, unskived length of the hose. The stem comprises a termination portion for attaching to a fixture (such as a flange, or the like) a cable trap groove, and an insert defining a plurality of lands inter-indexing with the ferrule ridges. The insert has an outside diameter generally corresponding to an inside diameter of the tube of the hose and is inserted into the further portion of the hose from which the tube has not been skived. The cable trap groove corresponds to the cable trap rib and is preferably disposed under the end portion. The groove has a diameter greater than an inside diameter of a tube of the hose, but less than an inside diameter of the hose with the tube skived from the hose. Also, the groove preferably has a width that is at least the width of the rib, plus twice the diameter of cable reinforcing the hose.

In accordance with various embodiments, epoxy may be disposed between the tube and the stem, prior to compression of the ferrule, to aid in sealing the tube of the hose against the stem following compression of the ferrule. Alternatively, or additionally, low viscosity epoxy may be injected into the fitting, such as through a weephole, to in between the ferrule and the cable, after compression.

Advantageously, the present invention provides better coupling retention, resistance to extreme temperatures and separation of retention from sealing because rubber material properties are taken out of the coupling retention mechanism. Further, in contrast to prior systems, since the diameter of the reinforcing wire rope may slightly expand at elevated temperatures, the cable trap provided by the rib and groove described above bearing directly on the bare cable as a result of skiving of both the cover and the tube preferably tightens.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 3 is a fragmented, generally quarter sectional view of the embodiment of the coupling of FIG. 2 deployed, uncompressed, on a cable reinforced hose;

FIG. 4 is a fragmented, generally quarter sectional view of the embodiment of the coupling of FIGS. 2 and 3 installed, compressed, on a cable reinforced hose shown in FIG. 3.

DETAILED DESCRIPTION

Figure 1:
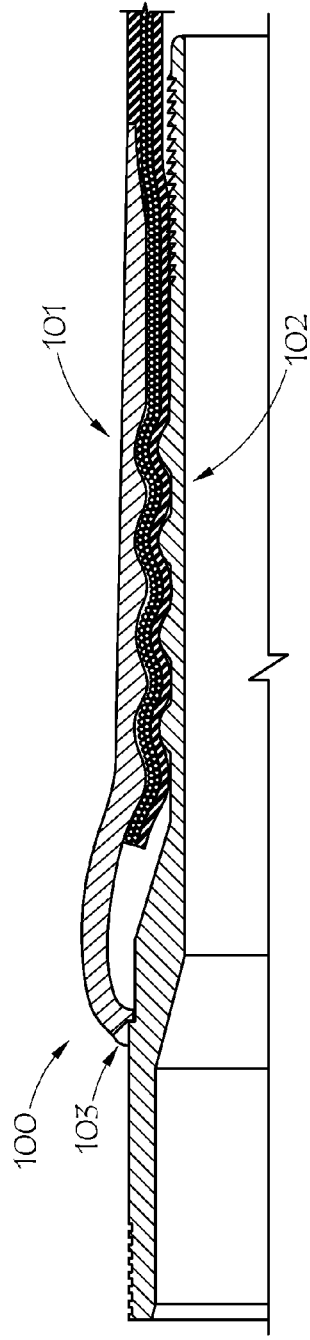
FIG. 1 is a fragmented, generally sectional view of a crimped or swaged prior art coupling installed on a cable reinforced hose.
Figure 2:
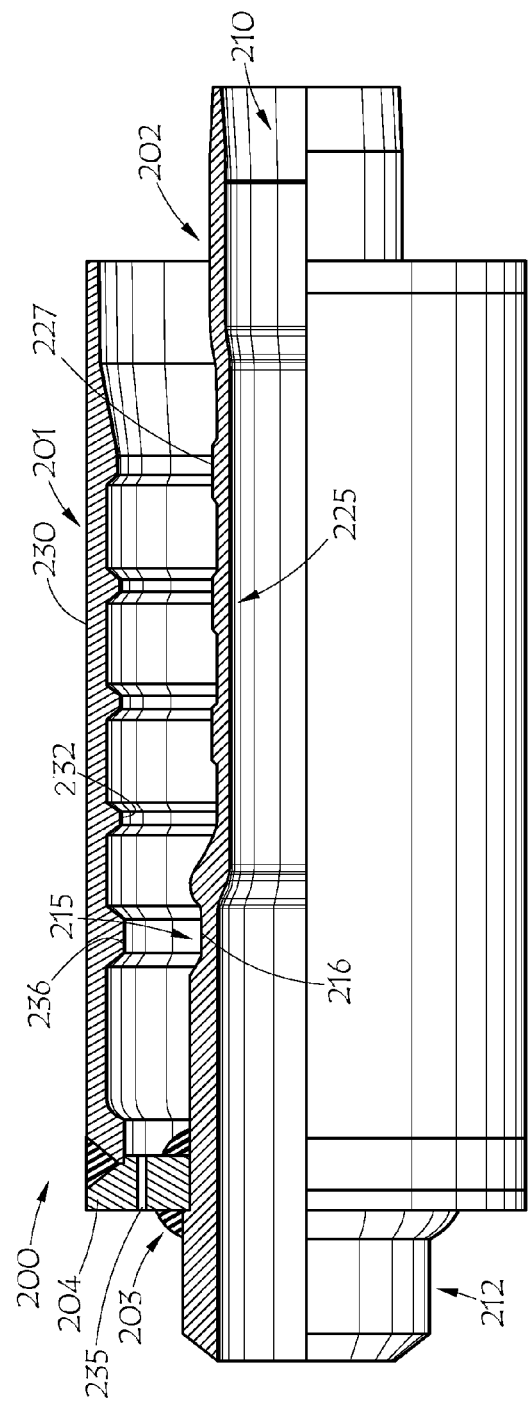
FIG. 2 is a fragmented, generally quarter sectional view of an embodiment of a coupling of the present invention.
Figure 5:
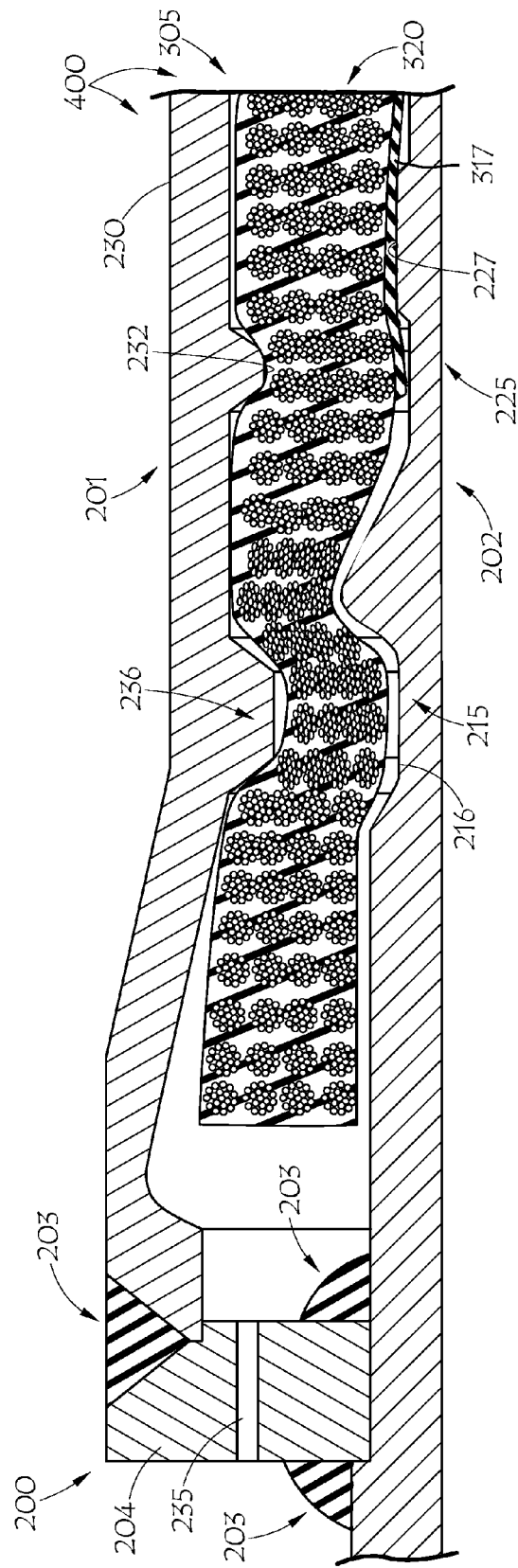
FIG. 5 is an enlarged, fragmented, generally sectional view of the embodiment of a coupling of FIGS. 2-4 shown installed, compressed, on the hose as shown in FIG. 4.

As noted, FIG. 2 is a quarter sectional view of an embodiment of coupling 200 of the present invention. In FIG. 3 coupling 200 is deployed, uncompressed, on cable reinforced hose 305, which may be a blowout preventer choke and kill hose, or the like. Hose coupling embodiment 200 includes unitary stem 202 and unitary ferrule 201, which may be welded (203), staked or otherwise secured together, such as through the use of circular plate 204, or similar mechanism.

Various embodiments of stem 202 may have inner bore 210 and termination structure portion 212 for attaching coupling 200 and hose 305 on which it is swaged or crimped to a fixture, such as a flange, or the like. Termination structure 212 may take the form of a bud, or the like, that may be welded to a flange or the like for fitment using a hammer union, or the like. Stem 202 preferably defines cable trap groove 215, which is illustrated in FIGS. 2 through 5 as generally trapezoidal in shape. However, such cable trap grooves may, in accordance with the present invention, be of a number of different shapes, such as, generally rounded, chevron-shaped, generally rectangular, etc. Root 216 of groove 215 preferably has a diameter that is greater than an inside diameter of inner tube 317 of hose 305. The diameter of groove root 216 is also preferably less than an inside diameter of the hose with inner tube 317 skived from the hose, that is less than the inside diameter of cable reinforcement layer 320 of hose 305, as may best be seen in FIG. 3. An insert portion 225 of the stem is adapted for insertion into inner tube 317 of hose 305. Insert portion 225 preferably defines a plurality of external lands 227 and has an outside diameter generally corresponding to an inside diameter of inner tube 317 of the hose 305. When ferrule 201 is secured to stem 202, such as by welding or staking as discussed above, termination portion 212 of stem 202 preferably extends from ferrule 201 and cable trap groove 215 and insert 225 of stem 202 are disposed in ferrule 201.

Unitary ferrule 201 has an outer surface 230 and an inside having a number of diameters defining a number of features, but primarily a first and second inside diameters, defining a plurality of ridges 232 and a cable trap rib 236. The first inside diameter of unstaked or uncrimped ferrule 201, such as shown in FIGS. 2 and 3 is preferably greater than an outside diameter of wire stranded cable reinforced hose 305, as best seen in FIG. 3. The second inside diameter of unstaked or uncrimped ferrule 201 may be less than the outside diameter of cable reinforced hose 305, but is preferably greater than an outside diameter of hose 305 with material covering cable reinforcement 320, such as cover 333, skived from the hose. In other words the second inside diameter of the ferrule is preferably greater than the outside diameter of cable reinforcing layer 320 of hose 305, but may be less than the outside diameter of the hose overall. Preferably, ridges 232 are positioned to generally inter-index with lands 227 of stem 202. Another portion of the inner surface of the ferrule defines at least one cable trap rib 236, positioned to correspond to cable trap groove 215 in stem 202. Cable trap rib 236 has the second aforementioned inside diameter and is preferably narrower than groove 215. Preferably, groove 215 has a width that is at least the width of rib 236 plus at least, or about, twice the diameter of a cable reinforcing hose 305. Also, preferably, the width of rib 236 is greater than the diameter of a cable reinforcing hose 305, such as on the order of multiple diameters of the cable reinforcing hose 305.

The embodiment illustrated in FIGS. 2 through 5 has a single cable trap groove, 215 and a single rib, 216. However, any number of cable traps can be employed on a coupling in accordance with the present invention. For example, a plurality of cable trap ribs may be employed in conjunction with a corresponding number of cable trap grooves.

In accordance with various embodiments for securing a fitting, such as fitting 200, to the end of a cable reinforced hose, such as hose 305, which may be a blowout preventer choke and kill hose, or the like, layer(s) 333 of hose 305 covering cable reinforcement 320 are skived from an end portion of hose 305 and inner tube 317 is skived from an inside distal extent of the end portion of hose 305. Generally, this distal extent from which the tube is skived is only a portion of the end of the hose from which the cover is skived. Unitary stem 202, having inner bore 210, termination 212 for attaching to a fixture, cable trap groove 215 and insert portion 225, is inserted into the skived hose. Insert portion 225 is inserted inside (unskived) inner tube 317 of cable reinforced hose 305, with cable trap groove 215 inserted inside the skived distal extent of hose 305. Unitary ferrule 201 is preferably deployed over the end of the hose 305 and stem 202, with ridges 232 of ferrule 201 inter-indexing with lands 227 defined on an outside of insert 225 and with cable trap rib 236 corresponding with, that is generally aligning with, cable trap groove 215. Such deployment of ferrule 201 and stem 202 may occur generally simultaneously if ferrule 201 is welded to stem 202 prior to disposition. Following disposition of ferrule 201 and stem 202, ferule 201 is compressed, such as by swaging or crimping, resulting in ridges 232 compressing the end of hose 305 to seal hose inner tube 317 against lands 227 and resulting in rib 236 forcing cable reinforcement 320 into groove 215. Preferably, this traps cable reinforcement in the double-skived area between rib 236 and groove 215. Also, in accordance with various embodiments, at least some of the individual cables making up cable reinforcement 320 are deformed by the compression of the cable trap rib, particularly compression of the cable trap rib, with respect to the uncompressed cable trap groove. This deformation of individual cables is best seen in enlarged FIG. 5. Entrapment of the cable by the compressed cable trap, comprised of rib 236 and groove 215, secures coupling 200 to hose 305 in a manner that does not depend on gripping rubber or polymeric material, such as cover 333 and/or inner tube 317.

Thus, in accordance with various embodiments of the present invention, a resulting hose assembly 400 (FIGS. 4 and 5) may be made up from a length of hose 305 having inner tube 317 and rubber covering 333 skived out of and off of end portions of hose 305 and coupling 200, such as discussed above swaged or crimped on the end of hose 305.

In accordance with some embodiments, epoxy (not shown in Figures for sake of clarity) may be disposed between tube 227 and stem 202, prior to compression of ferrule 201 to enhance sealing, and/or injected after compression of ferrule 201 to permeate cable reinforcement 320 with the epoxy in the areas where cover 333 and/or inner tube 317 is skived away to provide improved bonding of hose 305 and coupling 100.

For example, in some embodiments, a high temperature epoxy, such as epoxy 4525 from Cotronics Corporation, may be applied to stem 202 prior to insertion in hose 305. Since the epoxy is in two parts, the epoxy resin and the amine hardener cure in place regardless of the environment, i.e. oxygen, humidity, heat, etc. The epoxy may be placed on two lands 227 of insert 202, near the end of stem to prevent excess epoxy from entering into the stem or hose tube. Compression of ferrule 201 distributes the epoxy. In particular swaging advantageously moves the adhesive further into tube 227, along stem 202. Adding heat may facilitate set-up of the epoxy making the hose useable in a relatively short time frame.

In accordance with other embodiments, a high viscosity epoxy, such as epoxy 4461 from Cotronics Corporation, may be injected through weephole 235 to penetrate the interstices of the cables as well as any additional areas between the cable and stem 202. By filling the coupling and thus gaining access into very small cavities the epoxy will have increased contact surface area, and thus, increased bond strength, as well as enhanced sealing functionality. Advantageously, such low viscosity epoxy may be injected through weephole 235 after compression of ferrule 201, or before.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A hose assembly comprising:
  a length of hose comprising:
    an inner tube, said inner tube skived from a distal extent of an end portion of said hose;
    one or more layers of cable reinforcement; and
    one or more layers of rubber covering said cable reinforcement, said one or more layers of rubber covering skived from said end portion of said hose;
  a coupling swaged or crimped on said end portion and a further length of said hose, said coupling comprising:
    a unitary ferrule disposed over said end portion of said hose and said further length of said hose, said ferrule comprising:
      a first inside diameter, said first inside diameter being greater than an outside diameter of said hose;
      a second inside diameter, said second inside diameter being greater than an outside diameter of said end portion of said hose with said rubber covering skived from said hose; and
      an inner surface portion comprising:
        a plurality of ridges having said first diameter and disposed over said further length of said hose; and
        at least one cable trap rib having a width and said second inside diameter and disposed over said distal portion of said end portion of said hose; and
    a unitary stem disposed in said end portion of said hose and said further length of said hose, said stem comprising:
      a termination portion for attaching to a fixture;
      a cable trap groove portion corresponding to said cable trap rib and disposed under said distal portion of said end portion of said hose, said groove having an outside diameter greater than an inside diameter of a tube of said hose and less than an inside diameter of said hose with said tube skived from said hose, said groove having a width at least the width of said rib plus twice the diameter of said cable reinforcing said hose, a plurality of cables of said distal extent of said hose distorted between said rib and said groove; and
      an insert portion defining a plurality of lands inter-indexing with the ferrule ridges, said insert having an outside diameter generally corresponding to an inside diameter of said tube of said hose;
  wherein said coupling further comprises a weephole connecting the space occupied by the hose between said ferrule and said stem to the outside.

2. The hose assembly of claim 1, wherein said cable trap rib and said cable trap groove have generally corresponding generally trapezoidal shapes.

3. The hose assembly of claim 1, wherein said ferrule is disposed over an end of said hose with outside layers of said hose covering the cable reinforcement portion skived from an end of said hose.

4. The hose assembly of claim 3, wherein said stem is disposed with said insert inserted inside said tube of said hose and said cable trap groove is inserted inside a distal extent of said end of said hose with said tube skived away from said distal extent of said hose.

5. The hose assembly of claim 4, wherein epoxy is disposed between said ferrule and said stem, permeating said cable reinforcement where skived.

6. The hose assembly of claim 4, wherein said hose is a blow out preventer hose.

7. The hose assembly of claim 1, wherein said stem is disposed with said insert inserted inside said tube of said hose and said cable trap groove is inserted inside a distal extent of said hose with said tube skived away.

8. The hose assembly of claim 1, wherein said ferrule is welded to said stem with said termination portion of said stem extending from said ferrule and said cable trap groove and said insert of said stem disposed in said ferrule.

9. The hose assembly of claim 1, wherein said width of the rib is greater than a diameter of said cable reinforcing said hose.

10. The hose assembly of claim 1, wherein said width of the rib is greater than multiple diameters of said cable reinforcing said hose.

11. The hose assembly of claim 1, wherein said second inside diameter of said ferrule is less than said outside diameter of said hose.

12. The hose assembly of claim 1, wherein said ferrule is welded to said stem with said termination portion of said stem extending from said ferrule.

13. The hose assembly of claim 1, wherein epoxy is disposed between said tube and said stem, sealing the tube of the hose against the stem.

14. The hose assembly of claim 1, wherein said hose is a blow out preventer hose.

15. The hose assembly of claim 1, wherein said weephole passes through a circular plate securing said ferrule to said stem.

* * * * *